(12) United States Patent
Ueno

(10) Patent No.: US 10,156,951 B2
(45) Date of Patent: Dec. 18, 2018

(54) TOUCH PANEL

(71) Applicant: FUJITSU COMPONENT LIMITED, Tokyo (JP)

(72) Inventor: Yutaka Ueno, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 14/708,387

(22) Filed: May 11, 2015

(65) Prior Publication Data

US 2016/0026303 A1 Jan. 28, 2016

(30) Foreign Application Priority Data

Jul. 22, 2014 (JP) .................................. 2014-149104

(51) Int. Cl.
*G06F 3/045* (2006.01)
(52) U.S. Cl.
CPC ..................................... *G06F 3/045* (2013.01)
(58) Field of Classification Search
None
See application file for complete search history.

(56) References Cited

U.S. PATENT DOCUMENTS

| | | | | |
|---|---|---|---|---|
| 2003/0197688 A1* | 10/2003 | Aufderheide | ........... | G06F 3/045 345/173 |
| 2005/0190161 A1* | 9/2005 | Hong | ...................... | G06F 3/044 345/173 |
| 2006/0227114 A1 | 10/2006 | Geaghan et al. | | |
| 2009/0040192 A1* | 2/2009 | Haga | ...................... | G06F 3/044 345/174 |
| 2010/0013791 A1* | 1/2010 | Haga | ..................... | G06F 3/0412 345/174 |
| 2010/0259503 A1* | 10/2010 | Yanase | .................... | G06F 3/044 345/174 |

(Continued)

FOREIGN PATENT DOCUMENTS

| | | |
|---|---|---|
| JP | 6-119099 | 4/1994 |
| JP | 2008-535092 | 8/2008 |
| JP | 2013-168032 | 8/2013 |

OTHER PUBLICATIONS

Patent Abstracts of Japan, Publication No. 2013-168032, published Aug. 29, 2013.

(Continued)

*Primary Examiner* — Amare Mengistu
*Assistant Examiner* — Sarvesh J Nadkarni
(74) *Attorney, Agent, or Firm* — Staas & Halsey LLP

(57) ABSTRACT

A touch panel includes: a lower electrode substrate that includes: a first substrate surface; a first conductive film on the first substrate surface; and four electrodes on the first substrate surface; an upper electrode substrate that includes: a second substrate surface; a second conductive film formed on the second substrate surface and facing the first conductive film; an insulating layer formed on the second conductive film; and a conductive layer formed on the insulating layer, and a control unit that applies voltage to the electrodes and that detects a contact position at which the upper electrode substrate comes into contact with the lower electrode substrate by using an electric charge which is moved from the lower electrode substrate to the upper electrode substrate by the contact.

7 Claims, 8 Drawing Sheets

(56) References Cited

U.S. PATENT DOCUMENTS

2011/0037722 A1* 2/2011 Tseng .................... G06F 3/0416
                                                        345/174
2014/0346029 A1    11/2014 Sekizawa et al.

OTHER PUBLICATIONS

Patent Abstracts of Japan, Publication No. 6-119099, published Apr. 28, 1994.

Espacenet Bibliographic data, Publication No. 2008-535092, published Aug. 28, 2008.

* cited by examiner

TOUCH PANEL

CROSS-REFERENCE TO RELATED APPLICATION

This application is based upon and claims the benefit of priority of the prior Japanese Patent Application No. 2014-149104 filed on Jul. 22, 2014, the entire contents of which are incorporated herein by reference.

FIELD

A certain aspect of the embodiments is related to a touch panel.

BACKGROUND

There are known various types of touch panels such as: a resistance film type capable of receiving input both from a pen and a finger; an electrostatic capacity type (it is also called analog capacity coupling type) capable of receiving input from a finger; and an electrostatic coupling type capable of receiving input from a pen (for example, see Japanese Laid-open Patent Publication Nos. 2013-168032 and 06-119099 and Japanese National Publication of International Patent Application No. 2008-535092).

The touch panels of the resistance film type include different types such as a four-line type, a five-line type, and a diode type which is called a seven-line type. For example, as for the five-line type, four electrodes are arranged on a lower electrode substrate, and an upper electrode substrate functions as a probe for detecting voltage, which detects an operation position. In contrast, as for the electrostatic capacity type, four electrodes are arranged on a lower electrode substrate, and the current flowing depending on the approach of the finger to a transparent conductive film is detected, which detects an operation position.

SUMMARY

According to an aspect of the present invention, there is provided a touch panel including: a lower electrode substrate that includes: a first substrate surface; a first conductive film on the first substrate surface; and four electrodes on the first substrate surface; an upper electrode substrate that includes: a second substrate surface; a second conductive film formed on the second substrate surface and facing the first conductive film; an insulating layer formed on the second conductive film; and a conductive layer formed on the insulating layer, and a control unit that applies voltage to the electrodes and that detects a contact position at which the upper electrode substrate comes into contact with the lower electrode substrate by using an electric charge which is moved from the lower electrode substrate to the upper electrode substrate by the contact.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 8:
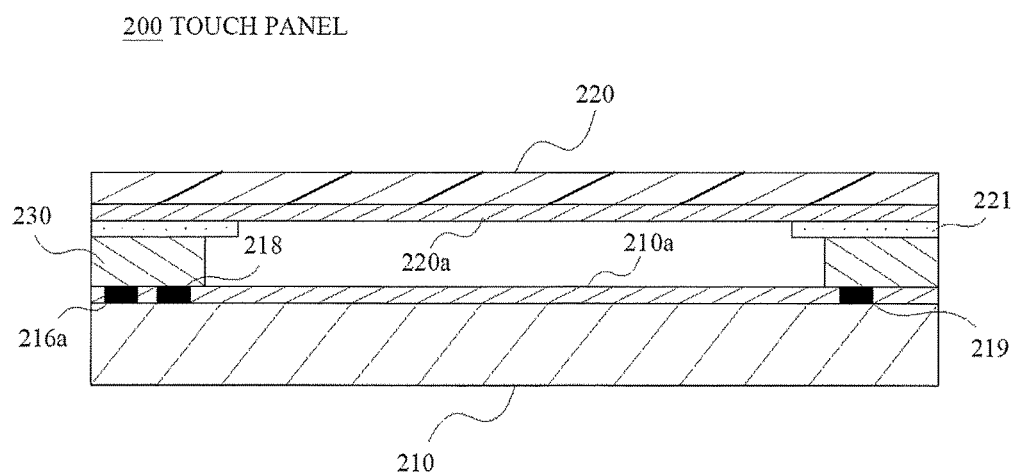
FIG. 8 is a cross-sectional view of a touch panel of a five-line type as an example.

In some cases, in the touch panel of the five-line type, the electrodes and wirings for applying voltage thereto provided on the lower electrode substrate are covered to suppress deterioration of the designability of the touch panel. FIG. 8 is a cross-sectional view of a touch panel 200 of a five-line type as an example. As illustrated in FIG. 8, design prints 221 each made of a conductive carbon ink are provided on both ends of a transparent conductive film 220a formed on an upper electrode substrate 220. If there is no design prints 221, electrodes 218 and 219 and a wiring 216a can be seen from the upper and front sides of the upper electrode substrate 220 through a colorless transparent adhesive 230 or spacer. Actually, the carbon ink is black, so the design prints 221 cover the electrodes 218 and 219 and the wiring 216a.

In such a touch panel of the five-line type, the design prints serve as electrodes of the upper electrode substrate. Thus, a controller connected to the upper electrode substrate and the lower electrode substrate measures voltage of the design prints when the upper electrode substrate comes into contact with the lower electrode substrate, and detects the input position by converting the measured voltage into coordinates. That is, to achieve the design prints in the touch panel of the five-line type, the design prints each has to be made of a conductive material. For this reason, the carbon ink is substantially limited to black, so it might be impossible to use a design print having a color other than black and to improve the designability of the touch panel.

The following will describe embodiments according to the present invention with reference to the drawings.

First Embodiment

Figure 1:
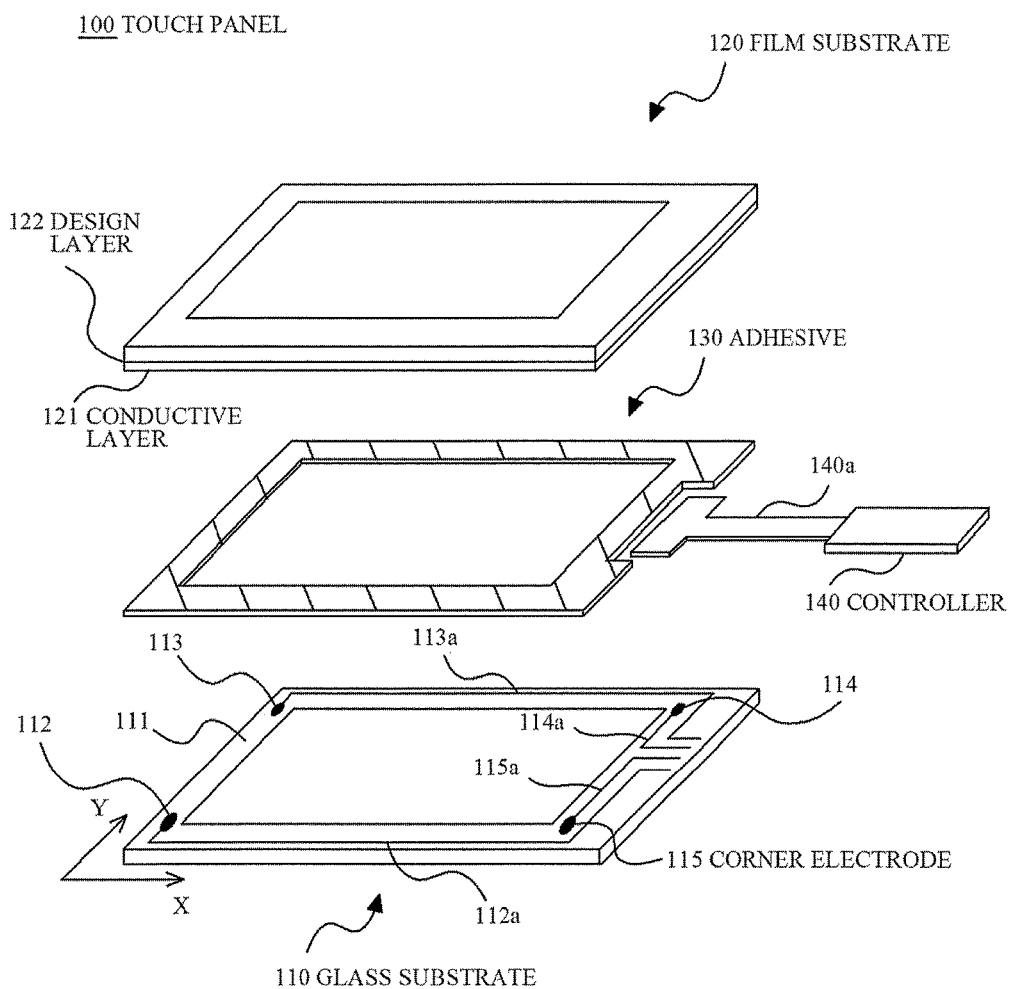
FIG. 1 is an exploded perspective view of a touch panel according to the first embodiment.
Figure 2:
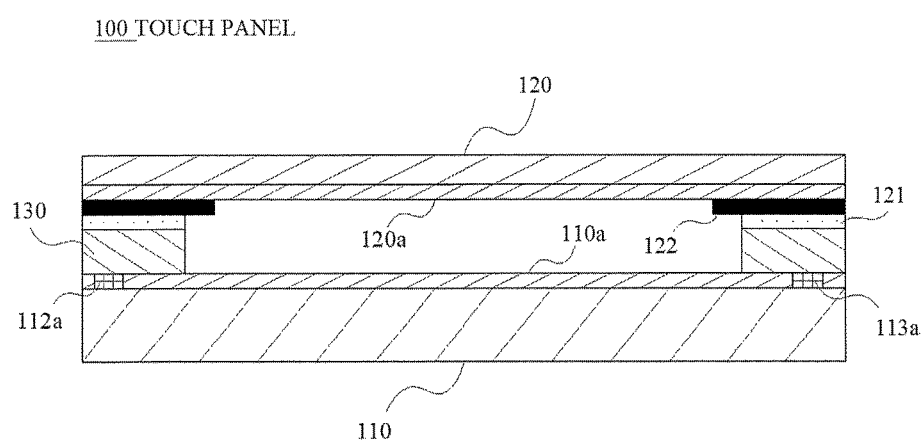
FIG. 2 is a cross-sectional view cutting a central portion of the touch panel according to the first embodiment along a line parallel with a Y-axis.
Figure 3:
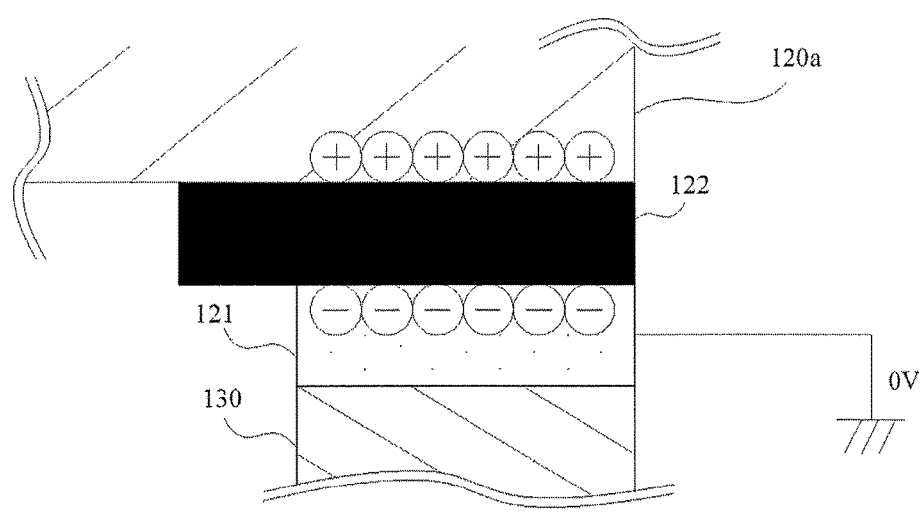
FIG. 3 is a view describing an ITO film with a film substrate contacting with a glass substrate.

FIG. 1 is an exploded perspective view of a touch panel 100 according to the first embodiment. FIG. 2 is a cross-sectional view cutting a central portion of the touch panel 100 according to the first embodiment along a line parallel with a Y-axis. FIG. 3 is a view describing an ITO film 120a with a film substrate 120 contacting with a glass substrate 110.

As illustrated in FIG. 1, the touch panel 100 includes: the glass substrate 110 as a lower electrode substrate; the film substrate 120 as an upper lower electrode substrate; an adhesive 130 adhesively bonding the glass substrate 110 with the film substrate 120; and a controller 140 as a control unit.

The glass substrate 110 is attached with the film substrate 120 via a gap or clearance ranging from about 60 µm to about 100 µm, in order to define a transparent operation region within a later described frame portion 111. In the touch panel 100, a contact point of the glass substrate 110 and the film substrate 120 within the operation region is detected as a two-dimensional coordinates. Additionally, in order to prevent the glass substrate 110 and the film substrate 120 from contacting and conducting with each other, plural dot spacers not illustrated are arranged therebetween.

Next, the glass substrate 110 will be described in detail.

The glass substrate 110 includes an Indium Tin Oxide (ITO) film 110a on one of its substrate surfaces, as illustrated in FIG. 2. A base material of the glass substrate 110 is, for example, a soda lime glass having a thickness of from about 0.7 mm to about 1.8 mm. Instead of this glass, a resin base material having a good optical transparency, preferably, of 80 percent or more may be used. For example, poly ethylene terephthalate (PET), polyether monkey phone (PES), polyetheretherketone (PEEK), polycarbonate (PC), polypropylene (PP), or polyamide (PA) can be used as such a resin base material.

The ITO film 110a on the glass substrate 110 is formed by vacuum depositing, sputtering, CVD, or printing. The ITO film 110a has a resistance higher than each resistance of four corner electrodes 112, 113, 114, and 115, referring to FIG. 1. The ITO film 110a having a thickness of from about 100 angstrom to about 150 angstrom is formed on the base material of the glass substrate 110. The ITO film 110a is 100 or more times each of the four corner electrodes 112, 113, 114, and 115 in sheet resistance value. An unneeded portion of the ITO film 110a formed on the glass substrate 110 is removed by photolithography, so a needed portion is remained. The ITO film 120a of the described later film substrate 120 is formed in the same manner.

The glass substrate 110 includes the frame portion 111 having a rectangular shape in its outer peripheral side, as illustrated in FIG. 1. The frame portion 111, which is a non-operation region against the operation region of the touch panel 100, corresponds to a frame portion. The four corner electrodes 112, 113, 114, and 115 are respectively located at four corners. These corner electrodes 112, 113, 114, and 115 are respectively connected to wirings 112a, 113a, 114a, and 115a on the substrate surface. The wirings 112a, 113a, 114a, and 115a are electrically connected to a flexible cable 140a at any one side of the frame portion 111, specifically, at a right side in FIG. 1. Additionally, the corner electrodes 112, 113, 114, and 115 and the wirings 112a, 113a, 114a, and 115a are formed on the substrate surface of the glass substrate 110 by screen-printing such as silver printing and carbon printing or by a double-sided tape having conductivity.

Ac voltage, for example, 5V is applied to each of the four corner electrodes 112, 113, 114, and 115 from the controller 140. Accordingly, a substantially uniform electric field is generated in the ITO film 110a in contact with the corner electrodes 112, 113, 114, and 115.

Next, the film substrate 120 will be described in detail.

The film substrate 120 is pushed by a pen or a finger, and includes the ITO film 120a on one of its substrate surfaces as illustrated in FIG. 2. A PET base material is preferably used in the film substrate 120. The PET base material has a thickness of, for example, from about 150 µm to about 200 µm, but the thickness is variable depending on the use application. The base material of the film substrate 120 is not limited to the PET base material, and may be another one having a flexibility. For example, ultrathin glass, PES, PEEK, PC, PP, PA, or the like is available. The ITO film 120a is the same as the ITO film 110a of the glass substrate 110.

The ITO film 120a of the film substrate 120 is provided with a conductive layer 121 through a design layer 122 as illustrated in FIG. 2. The conductive layer 121 is formed on the design layer 122 by screen-printing such as silver printing and carbon printing or by a double-sided tape having conductivity. A value of voltage less than or equal to the first voltage value, for example, 0V of AC voltage as the second voltage is applied to the conductive layer 121 from the controller 140. The design layer 122 is formed on the ITO film 120a by printing with a colored insulating ink. The colored insulating ink includes other colors besides black. For example, the design layer 122 with a single color other than the black, multiple colors, or mixed colors drastically improves the designability of the touch panel 100.

Since the insulating design layer 122 is sandwiched between the ITO film 120a of the film substrate 120 and the conductive layer 121 as illustrated in FIG. 2, the ITO film 120a of the film substrate 120 and the conductive layer 121 serve as a capacitor. When a finger touches the operation region of the touch panel 100, electric charges move from each of the corner electrodes 112, 113, 114, and 115 of the glass substrate 110 via the contact point to the film substrate 120, since no voltage is applied to the ITO film 120a of the film substrate 120. That is, current flows from each of the corner electrodes 112, 113, 114, and 115 by the contact of the glass substrate 110 with the film substrate 120. A magnitude of the current flowing from the respective corner electrodes 112, 113, 114, and 115 is inversely proportional to a distance between the contact point and the respective corner electrodes 112, 113, 114, and 115.

For example, when the contact point is closer to the corner electrode 112 than to the corner electrodes 113, 114, and 115, a short distance between the corner electrode 112 and the contact point decreases the resistance value of the ITO film 110a between the contact point and the corner electrode 112, causing the large current to flow from the corner electrode 112 to the contact point. In contrast, when the contact point is more distant to the corner electrode 112 than to the corner electrodes 113, 114, and 115, a long distance between the corner electrode 112 and the contact point increases the resistance value of the ITO film 110a between the contact point and the corner electrode 112, causing the small current to flow from the corner electrode 112 to the contact point. Thus, the currents flowing from each of the corner electrodes 112, 113, 114, and 115 are measured, and a ratio of each current is calculated, so the position of the contact point can be determined. Additionally, since the capacitor is formed between the ITO film 120a of the film substrate 120 and the conductive layer 121 as described above, the electric charges having moved to the film substrate 120 are charged, that is, are stored on the ITO film 120a of the film substrate 120 as illustrated in FIG. 3.

The adhesive 130 bonds the glass substrate 110 and the film substrate 120. The adhesive 130 is, for example, a double-side tape, a paste, or the like. The adhesive 130 serves as a spacer to define the gap between the glass substrate 110 and the film substrate 120. The adhesive 130 may be an insulating plastic film having both surfaces on which adhesive layers are respectively provided.

The controller 140 applies the voltage to the corner electrodes 112, 113, 114, and 115, and detects the position where the film substrate 120 comes into contact with the glass substrate 110. More specifically, the controller 140 applies the first voltage to the corner electrodes 112, 113, 114, and 115, applies the second voltage to the conductive layer 121, measures each current flowing to the corner electrodes 112, 113, 114, and 115 when the glass substrate 110 contacts with the film substrate 120, and detects the contact position based on the ratio of each measured current.

Figure 4:
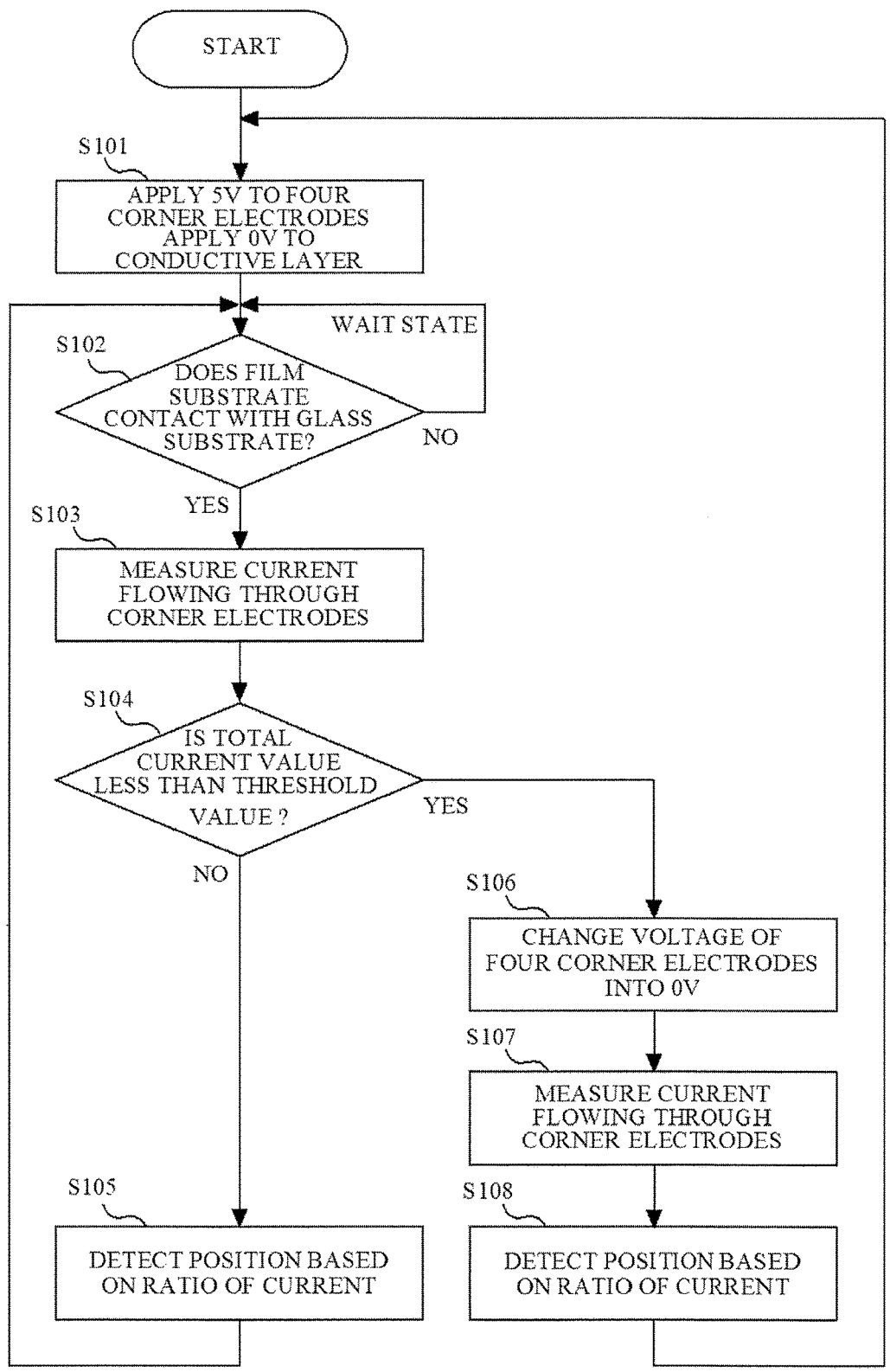
FIG. 4 is a flowchart indicating an operation of a controller according to the first embodiment.

Referring to FIG. 4, an operation of the controller 140 according to the first embodiment will be described next.

FIG. 4 is a flowchart indicating the operation of the controller 140 according to first embodiment.

First, the controller 140 applies 5V to the four corner electrodes 112, 113, 114, and 115, applies 0V to the conductive layer 121 (step S101), and determines whether or not the film substrate 120 comes into contact with the glass substrate 110 (step S102). Since the voltage of 5V is applied to the corner electrodes 112, 113, 114, and 115 and the voltage of 0V is applied to the conductive layer 121, when the film substrate 120 comes into contact with the glass substrate 110, the current flows from the corner electrodes 112, 113, 114, and 115 via the contact point to the film substrate 120. The controller 140 monitors the corner electrodes 112, 113, 114, and 115, and determines that the film substrate 120 comes into contact with the glass substrate 110 when detecting the current flows through the corner electrodes 112, 113, 114, and 115.

The controller 140 continues a wait state until determining that the film substrate 120 comes into contact with the glass substrate 110 (step S102: No). When detecting that the film substrate 120 comes into contact with the glass substrate 110 (step S102: Yes), the controller 140 measures each current flowing through the corner electrodes 112, 113, 114, and 115 (step S103). At this time, the controller 140 determines whether or not the total of each current value is less than a predetermined threshold (step S104). The process in step S104 is executed to determine whether or not the current is adequately large enough to detect the contact position. When it is determined that the total of each current value is not less than a predetermined threshold (step S104: No), the contact position where the film substrate 120 comes into contact with the glass substrate 110 is detected based on the ratio of each measured current (step S105). That is, it is determined that the total of each value of the current flowing through the corner electrodes 112, 113, 114, and 115 is large enough to detect the contact position, so the contact position is detected. When the controller 140 finishes the detection of the contact position, the process returns to step S102 and the controller 140 waits till the next operation.

In contrast, when determining that the total of each current value is less than a predetermined threshold in the process in step S104 (step S104: Yes), the controller 140 changes the voltage of the four corner electrodes 112, 113, 114, and 115 into 0V (step S106). The contact of the film substrate 120 with the glass substrate 110 is repeated, so the electric charges are charged because of the capacitor formed between the film substrate 120 and the conductive layer 121. Thus, a gradual decrease in the current flowing from the corner electrodes 112, 113, 114, and 115 of the glass substrate 110 to the film substrate 120 decreases the total values of the current, so the contact position might not be detected. For this reason, when the electric charges are charged in the film substrate 120 to such an extent not to detect the contact position, the voltage of 0V is applied to the four corner electrodes 112, 113, 114, and 115. Accordingly, the electric charges charged in the film substrate 120 start flowing through the contact point to the corner electrodes 112, 113, 114, and 115 of the glass substrate 110, thereby discharging the film substrate 120.

After executing the process in step S106, the controller 140 measures the current flowing through the corner electrodes 112, 113, 114, and 115 (step S107), and detects the contact position based on the ratio of the measured current (step S108). In this way, the position can be detected, even when the total value of the current is less than the threshold in step S104. After the controller finishes the detection of the position, the process returns to step S101. Thus, 5V is applied again to the corner electrodes 112, 113, 114, and 115 to which 0V had been applied. Hence, the voltage applied to the corner electrodes 112, 113, 114, and 115 is switched alternately from 5V to 0V.

As mentioned above, in the first embodiment where the film substrate 120 is provided with the conductive layer 121 through the insulating design layer 122, the contact position can be detected by calculating the ratio of the current flowing through the corner electrodes 112, 113, 114, and 115. Thus, the ink is not limited to the carbon black one. The design layer 122 using the various colors can drastically improve the designability of the touch panel 100.

Second Embodiment

The second embodiment according to the present invention will be described next. Additionally, parts that are the same as those of the touch panel 100 illustrated in FIG. 1 are given the identical reference numerals, and a description thereof is omitted here.

First, referring to FIGS. 5 and 6, a configuration of the touch panel 100 will be described.

Figure 5:
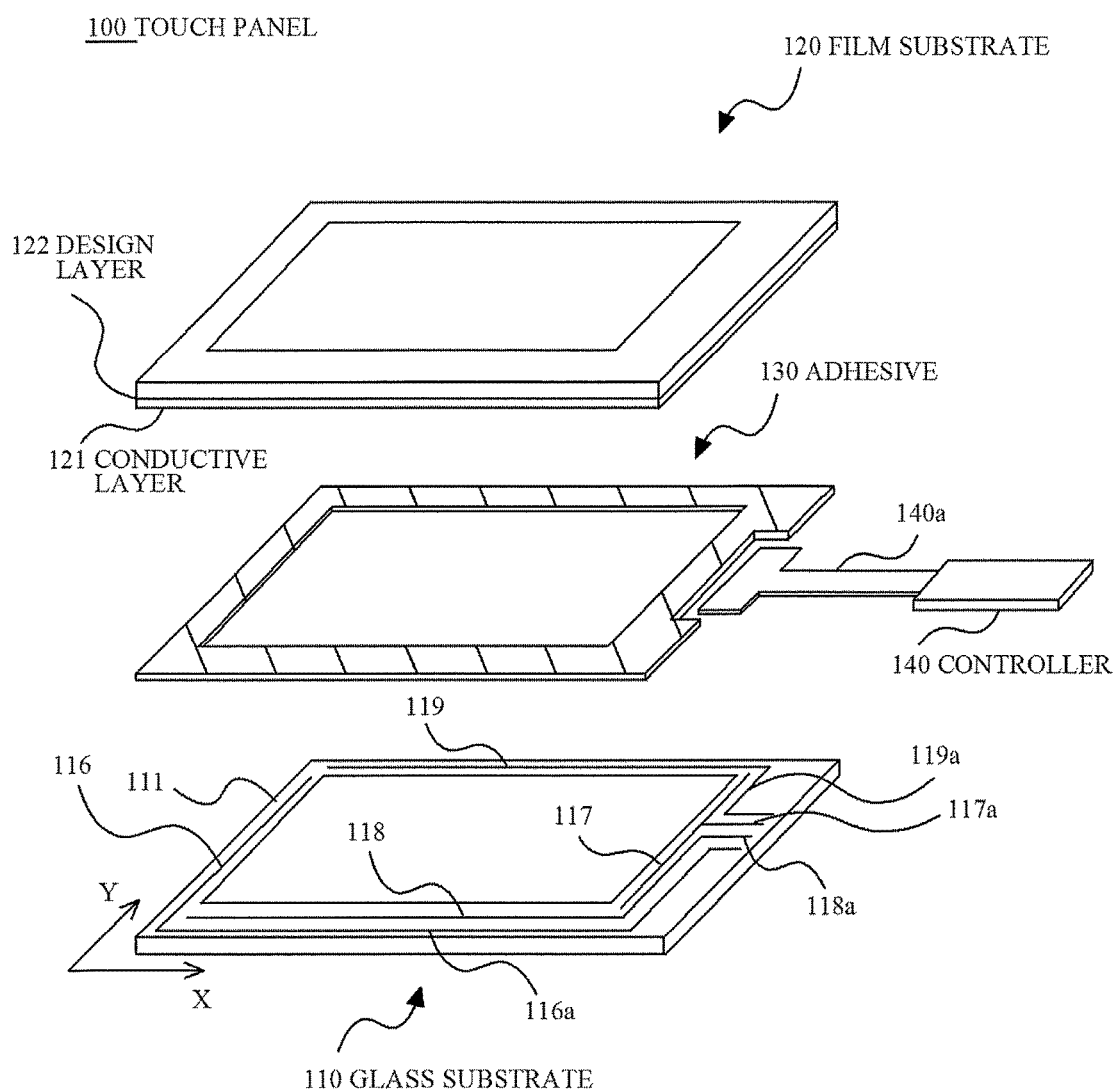
FIG. 5 is an exploded perspective view of the touch panel according to the second embodiment.

FIG. 5 is an exploded perspective view of the touch panel 100 according to the second embodiment. FIG. 6 is a plane view of the glass substrate 110 including X-axis electrodes 116 and 117 and Y-axis electrodes 118 and 119. In the second embodiment, the glass substrate 110 includes the X-axis electrodes 116 and 117 and the Y-axis electrodes 118 and 119, as illustrated in FIGS. 5 and 6. The film substrate 120 including the conductive layer 121 and the design layer 122 is the same as that according to the first embodiment.

Figure 6:
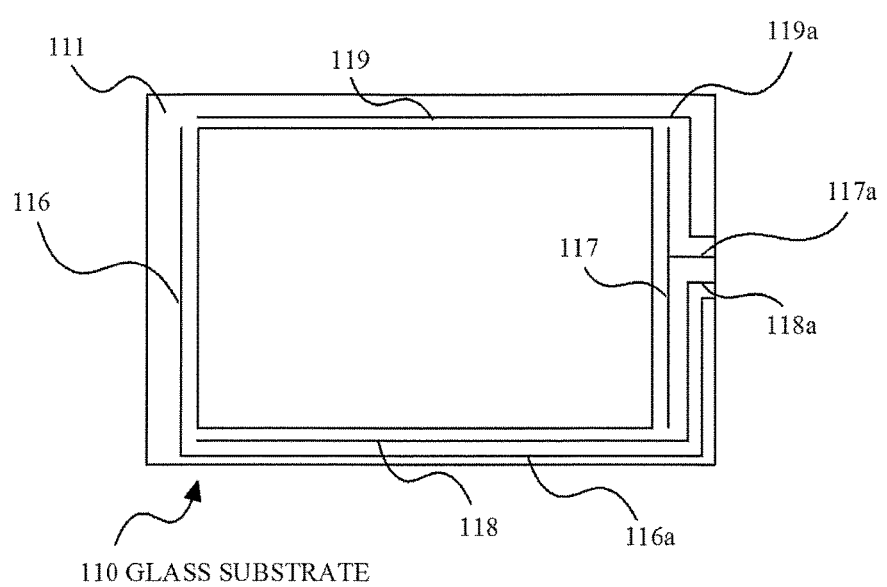
FIG. 6 is a plane view of the glass substrate including X-axis electrodes and Y-axis electrodes.

As illustrated in FIGS. 5 and 6, in the glass substrate 110, the X-axis electrodes 116 and 117 parallel with each other are respectively provided at short sides of the frame portion 111. A pair of the X-axis electrodes 116 and 117 apply voltage to the ITO film (not illustrated) to generate an electric potential gradient in such a direction that the X-axis electrodes 116 and 117 face each other. One of the X-axis electrodes 116 and 117 is an anode electrode, and the other is a cathode electrode. The X-axis electrodes 116 and 117 extend together along the side of the ITO film in the Y-axis direction. Wirings 116a and 117a electrically interconnect the X-axis electrodes 116 and 117 with terminals of the flexible cable 140a, respectively. The wiring 116a is connected to an end portion of the X-axis electrode 116. The wiring 117a is connected to a central portion of the X-axis electrode 117. The first AC voltage (for example, 5V) and the second AC voltage (for example, 0V) are respectively supplied to the X-axis electrodes 116 and 117 through the wirings 116a and 117a from the controller 140.

In the same way, in the glass substrate 110, the Y-axis electrodes 118 and 119 parallel with each other is respectively provided at long sides of the frame portion 111. A pair of the Y-axis electrodes 118 and 119 apply voltage to the ITO film to generate an electric potential gradient in such a direction that the Y-axis electrodes 118 and 119 face each other. One of the Y-axis electrodes 118 and 119 is an anode electrode, and the other is a cathode electrode. The Y-axis electrodes 118 and 119 extend together along the side of the ITO film in the X-axis direction. Wirings 118a and 119a electrically interconnect the Y-axis electrodes 118 and 119 with terminals of the flexible cable 140a, respectively. The wirings 118a and 119a are respectively connected to end portions of the Y-axis electrodes 118 and 119. The first AC voltage (for example, 5V) and the second AC voltage (for example, 0V) are respectively supplied to the Y-axis electrodes 118 and 119 through the wirings 118a and 119a from the controller 140.

Figure 7:
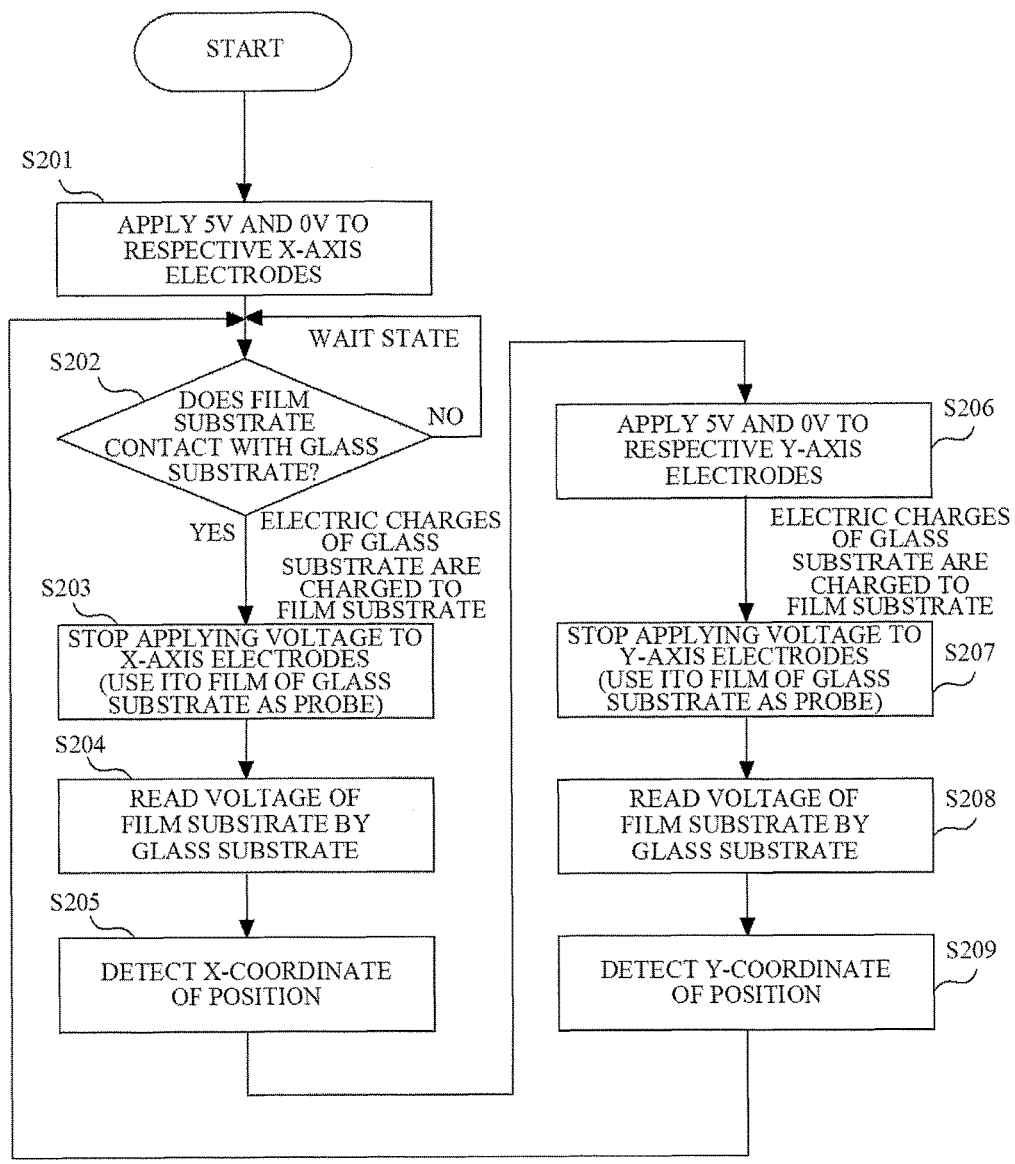
FIG. 7 is a flowchart indicating an operation of the controller according to the second embodiment.

Referring to FIG. 7, an operation of the controller 140 according to the second embodiment will be described next.

FIG. 7 is a flowchart indicating an operation of the controller 140 according to the second embodiment.

First, the controller 140 respectively applies 5V and 0V to the X-axis electrodes 116 and 117 (step S201), and determines whether or not the film substrate 120 comes into contact with the glass substrate 110 (step S202). Since the voltages of 5V and 0V are respectively applied to the X-axis electrodes 116 and 117, the electric potential gradient is generated in the ITO film formed on the glass substrate 110. When the film substrate 120 comes into contact with the glass substrate 110, the current flows from the X-axis electrode 116 via the contact point to the film substrate 120. The controller 140 monitors the X-axis electrode 116, and determines that the film substrate 120 comes into contact with the glass substrate 110 when detecting the current flows from the X-axis electrode 116. When the film substrate 120 comes into contact with the glass substrate 110, the electric charges of the glass substrate 110 are charged to the film substrate 120 by the current flowing from the X-axis electrode 116.

The controller 140 continues a wait state until determining that the film substrate 120 comes into contact with the glass substrate 110 (step S202: No). When detecting that the film substrate 120 comes into contact with the glass substrate 110 (step S202: Yes), the controller 140 stops applying the voltage to the X-axis electrode 116 (step S203). This leads to 0 voltage of both X-axis electrodes 116 and 117, so the ITO film of the glass substrate 110 acts as a probe. That is, the ITO film of the glass substrate 110 can be used as a probe. In this state, the controller 140 reads the voltage of the film substrate 120 by using the glass substrate 110 as a probe (step S204), and detects the X-coordinate of the contact position (step S205). The controller 140 cannot directly read the voltage of the film substrate 120, because no electrode is provided in the film substrate 120 and because the conductive layer 121 is insulated by the ITO film of the film substrate 120 and the design layer 122. For this reason, the controller 140 reads the voltage of the film substrate 120 by using the glass substrate 110 as a probe, and detects the X-coordinate of the contact position based on the read voltage.

Next, the controller 140 respectively applies 5V and 0V to the Y-axis electrodes 118, and 119 (step S206). The electric charges of the glass substrate 110 are charged to the film substrate 120 by the current flowing out of the Y-axis electrode 118. Subsequently, the controller 140 stops applying the voltage to the Y-axis electrode 118 (step S207). This leads to 0 voltage of both Y-axis electrodes 118 and 119, so the ITO film of the glass substrate 110 acts as a probe. In this state, the controller 140 reads the voltage of the film substrate 120 by using the glass substrate 110 as a probe (step S208), and detects the Y-coordinate of the position (step S209). As mentioned above, since the controller 140 cannot read the voltage of the film substrate 120, the controller 140 reads the voltage of the film substrate 120 by using the glass substrate 110 and detects the Y-coordinate of the position. After detecting the Y-coordinate of the position, the controller 140 returns to the process in step S202.

Consequently, even in a case using the film substrate 120 including the conductive layer 121 and the design layer 122 in the touch panel 100, the electric charges are charged to the film substrate 120 and the voltage depending on the electric charges are read by the glass substrate 110, which can detect the contact position.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A resistive touch panel comprising:
   a lower electrode substrate that includes
      a first substrate surface;
      a first conductive film formed on the first substrate surface; and
      four corner electrodes provided on the first substrate surface and respectively located at four corners of the first substrate surface;
   an upper electrode substrate that includes
      a second substrate surface;
      a second conductive film formed on the second substrate surface and facing the first conductive film with a gap between the first conductive film and the second conductive film, the first conductive film and the second conductive film coming into contact with each other when the touch panel is operated;
      an insulating layer formed on the second conductive film; and
      a conductive layer formed on the insulating layer, the conductive layer being insulated from the second conductive film by the insulating layer, a first voltage being applied to the conductive layer;
   an insulating spacer provided between the first conductive film and the conductive layer and forming the gap between the first conductive film and the second conductive film; and
   a control unit configured to alternately apply a second voltage which is higher than the first voltage and 0V to each of the four corner electrodes, and to detect a contact position at which the upper electrode substrate comes in contact with the lower electrode substrate by measuring electric current flowing through each of the four corner electrodes.

2. The touch panel of claim 1, wherein the control unit detects the contact position based on a ratio of the four measured electric currents of the four corner electrodes.

3. The touch panel of claim 1, wherein the control unit changes voltage to be applied to each of the four corner electrodes from the second voltage to 0V, when a total value of four measured electric currents of the four corner electrodes is equal to or less than a predetermined threshold value.

4. A resistive touch panel comprising:
   a lower electrode substrate that includes
      a first substrate surface;
      a first conductive film formed on the first substrate surface; and
      four electrodes provided on the first substrate surface and respectively located at four corners of the first substrate surface;

an upper electrode substrate that includes
  a second substrate surface;
  a second conductive film formed on the second substrate surface and facing the first conductive film with a gap between the first conductive film and the second conductive film;
  an insulating layer formed on the second conductive film; and
  a conductive layer formed on the insulating layer, the conductive layer being insulated from the second conductive film by the insulating layer, a first voltage being applied to the conductive layer;
an insulating spacer provided between the first conductive film and the conductive layer and forming the gap between the first conductive film and the second conductive film; and
a control unit configured to:
  apply a second voltage that is higher than the first voltage to one of first two electrodes arranged along an X-axis direction among the four electrodes and 0V to another one of the first two electrodes, and detect the contact position in the X-axis direction, at which the upper electrode substrate comes into contact with the lower electrode substrate, by measuring voltage on the second conductive film; and
  apply the second voltage to one of second two electrodes arranged along Y-axis direction among the four electrodes and 0V to another one of the second two electrodes, and detect the contact position in the Y-axis direction, at which the upper electrode substrate comes in contact with the lower electrode substrate, by measuring voltage on the second conductive film.

5. The touch panel of claim 4, wherein the control unit stops applying the second voltage when it is determined that the upper electrode substrate comes into contact with the lower electrode substrates, and measures the voltage while applying of the first voltage is stopped.

6. A resistive touch panel comprising:
a lower electrode substrate that includes
  a first substrate surface;
  a first conductive film formed on the first substrate surface; and
  four electrodes provided on the first substrate surface;
an upper electrode substrate that includes
  a second substrate surface;
  a second conductive film formed on the second substrate surface, facing the first conductive film and coming into contact with the first conductive film when the touch panel is operated;
  a design layer formed of colored insulating ink formed on the second conductive film; and
  a conductive layer formed on the design layer, the conductive layer being insulated from the second conductive film by the design layer, and a first voltage being applied to the conductive layer;
an insulating spacer provided between the first conductive film and the conductive layer and forming a gap between the first conductive film and the second conductive film; and
a control unit configured to apply an alternating voltage to each of the four electrodes, and to detect a contact position at which the upper electrode substrate comes in contact with the lower electrode substrate by using an electric charge which is moved from the lower electrode substrate to the upper electrode substrate by the contact of the first conductive film and the second conductive film.

7. The touch panel of claim 1, wherein the first voltage is 0V.

* * * * *

UNITED STATES PATENT AND TRADEMARK OFFICE
CERTIFICATE OF CORRECTION

PATENT NO. : 10,156,951 B2
APPLICATION NO. : 14/708387
DATED : December 18, 2018
INVENTOR(S) : Yutaka Ueno Page 1 of 1

It is certified that error appears in the above-identified patent and that said Letters Patent is hereby corrected as shown below:

In the Claims

In Column 8, Line 66, In Claim 4, delete "corners" and insert -- sides --, therefor.

Signed and Sealed this
Nineteenth Day of February, 2019

Andrei Iancu
*Director of the United States Patent and Trademark Office*